United States Patent Office 3,400,104
Patented Sept. 3, 1968

3,400,104
PROCESS FOR PREPARING ORGANIC DISULFIDES
Robert W. Liggett, Birmingham, Ala., assignor to Allied Chemical Corporation, New York, N.Y., a corporation of New York
No Drawing. Original application Mar. 2, 1965, Ser. No. 436,687, now Patent No. 3,367,975, dated Feb. 6, 1968. Divided and this application Oct. 26, 1967, Ser. No. 688,642
3 Claims. (Cl. 260—79)

ABSTRACT OF THE DISCLOSURE

A process for preparing a polymeric organic disulfide by the reaction of an alkali metal tetrathiocarbonate with an organic halide. The polymers are useful in coating, impregnating, sealing and caulking compositions.

---

This is a division of application Ser. No. 436,687, filed Mar. 2, 1965, now Patent No. 3,367,975. The invention relates to a process for preparing organic disulfides by the reaction of an alkali metal tetrathiocarbonate with an organic halide. The resulting disulfide reaction products are monomeric or polymeric compounds depending on whether the organic halide used is mono-functional or poly-functional.

In accordance with the present invention, an organic halide is mixed with a stoichiometric proportion of an alkali metal tetrathiocarbonate in a lower aliphatic alcohol reaction medium, and the mixture is heated at refluxing temperature for a period sufficient to bring about the desired reaction as illustrated below, usually a period between about 30 minutes and about 48 hours.

$$MS-\overset{S}{\underset{\|}{C}}-S-SM + 2\ RX_n \longrightarrow R-S-S-R + 2\ MX + CS_2$$

wherein M is an alkali metal, R is an organic radical, X is a halogen selected from the group consisting of chlorine and bromine, and $n$ is an integer from 1 to 3 inclusive.

Any organic halide that will react with the alkali metal tetrathiocarbonate at the reflux temperature of the alcohol solution may be employed provided that the halide is not so volatile that it may escape from the reaction mixture as a gas before reacting, and provided that it does not undergo simultaneous secondary or side reactions. In practice, I prefer to employ mono-, di-, and trifunctional primary and secondary aliphatic chlorides and bromides of 1 to 20 carbon atoms containing in addition to the chlorine substituents only aliphatic hydrocarbon, or ether, or acetal groups.

Especially useful monofunctional halides are the primary aliphatic bromides and chlorides of the general formula $$R^1CH_2X$$

wherein $R^1$ is an aliphatic hydrocarbon group of 1 to 20 carbon atoms and X is chlorine or bromine. Illustrative of this group there may be mentioned ethyl bromide, ethyl chloride, propyl chloride and bromide, butyl chloride and bromide, pentyl chloride and bromide, and the hexyl, heptyl, octyl, decyl and up to dodecyl chloride and bromide.

Monofunctional secondary aliphatic bromides and chlorides containing 3 to 20 carbon atoms inclusive are also especially useful, for example, 2-bromopropane, 2-bromobutane, 2-bromooctane, 2-bromodecane, up to 2-bromododecane and the corresponding chlorides, 2-chloropropane, 2-chlorobutane, 2-chlorooctane, 2-chlorooctadecane, 2-chlorododecane, as well as the isomeric secondary aliphatic 3-20 carbon atoms chlorides and bromides, in which the halogen atom is attached to other than the second atom of the hydrocarbon chain such as 3-chlorooctane, 4-bromooctane, and so on.

Suitable di- and trifunctional halides include the 1-20 carbon atom aliphatic dibromides and dichlorides, for example, bis(2-chloroethyl) ether, bis(2-bromoethyl) ether, bis(2-chloroethyl) formal, bis(2-bromoethyl) formal, bis-(chloropropyl) formal, bis(bromobutyl) formal, bis(chloropentyl) formal, ethylene dichloride, ethylene dibromide, propylene dichloride, propylene dibromide, 1,2,3-trichloropropane, 1,2,3-tribromopropane, trichlorobutane, trichloropentane, and the like.

My preferred di- and trifunctional reactants are bis(2-chloroethyl) formal, bis(2-bromoethyl) formal, bis-(2-chloroethyl) ether, bis(2-bromoethyl) ether, 1,2,3-trichloropropane and 1,2,3-tribromopropane.

When the organic halide is monofunctional, the resulting reaction product is a simple monomeric compound. Thus such halides as methyl chloride or bromide, ethyl chloride or bromide, propyl chloride or bromide, butyl chloride or bromide, etc., result in the production of the monomeric disulfides:

$$CH_3-S-S-CH_3$$
$$CH_3CH_2-S-S-CH_2CH_3$$
$$CH_3CH_2CH_2-S-S-CH_2CH_2CH_3$$
$$CH_3CH_2CH_2CH_2-S-S-CH_2CH_2CH_2CH_3$$

and so on.

When a di- or trifunctional organic halide is employed, i.e., $n$ is 2 or 3 in the above equation, the resulting reaction products are polymeric compounds and form repeating units of the character:

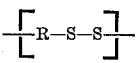  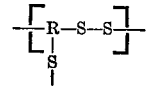

$$-\left[R-S-S\right]- \qquad -\left[\begin{matrix}R-S-S\\|\\S\\|\\S-\end{matrix}\right]-$$

Polymer from difunctional halide    Polymer from trifunctional halide

The reactions indicated above are unexpected in that the disulfide linkage is introduced into the polymeric unit rather than a tetrathiocarbonate unit. The process of my invention therefore provides a novel means for introducing the disulfide linkage into organic polymers of this character.

In accordance with a specific embodiment of the present invention, solid disulfide polymers are prepared by the reaction of bis(2-haloethyl) formal with an alkali metal tetrathiocarbonate in substantially stoichiometric proportions, with or without the inclusion of small proportions of trichloropropane as cross linking agent, thus producing a solid, acetone-insoluble polymer. The solid polymer can then be liquefied, as by reaction with sodium hydrosulfide, and the liquid polymer resolidified in final use with an oxidizing agent such as lead dioxide.

The reaction according to my invention proceeds as indicated below:

$$Na-S-\overset{S}{\underset{\|}{C}}-S-S-Na + XC_2H_4OCH_2OC_2H_4X \longrightarrow$$

sodium tetrathiocarbonate    dihaloethyl formal $$-\left[C_2H_4OCH_2OC_2H_4-S-S\right]- + 2\ NaX + CS_2$$

disulfide polymer wherein X represents chlorine or bromine.

In carrying out the prepartion of the disulfide polymers of my invention, the alkali metal tetrathiocarbonate (e.g., $Na_2CS_4$) and a difunctional halide such as dichloro- or dibromoethyl formal are mixed and dispersed in a lower aliphatic alcohol reaction medium in substantially stoichiometric proportions. Methyl, ethyl, propyl, and butyl alcohols are especially suitable, ethyl alcohol being preferred. If desired, small proportions of trifunctional halide cross linking agent such as trichloropropane may be substituted for a small part of the difunctional dihaloethyl formal to increase the viscosity of the resulting polymer, but this is not necessary for the production of a solid elastic polymer. The resulting mixture is then heated conveniently at or below the reflux temperature of the mixture, for example, between about 40°C. and about 100° C., and maintained at these temperatures until polymerization is complete, usually in a period not more than about 50 hours, usually between about 10 hours and about 30 hours. In general, it is preferred to blanket the reactants with nitrogen or other inert gas to avoid premature oxidation of the product.

Proportions of reactants will preferably be in the molar ratio of alkali metal tetrathiocarbonate to dihaloethyl formal to trichloropropane between 1:1:00 to 1:0.85:0.10.

The resulting polymer product may be a mixture of solid and liquid polymers which can be separated from each other by successive extraction with ethyl alcohol and acetone.

The solid polymers thus produced can be liquefied in the manner known in the liquefaction of conventional polysulfide polymers as by treatment with a cleavage agent, such as sodium hydrosulfide (NaHS) or mixture of sodium hydrosulfide and sodium sulfite to break the polymer molecules at the —S—S— link and generate mercapto groups as illustrated below:

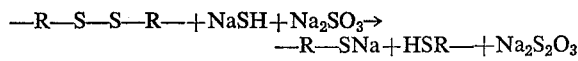

The resulting liquefied polymers are capable of being cured at room temperature (ca 20° C.) or elevated temperatures to rubber-like solids, and thus are useful in a variety of applications, including coating and impregnating compositions and in sealing and caulking materials, particularly for use in sealing curtain wall expansion joints. They are also useful in the preparation of irregularly shaped rubber-like articles which can conveniently be made from the liquefied polymers by casting them in suitable molds and curing them to produce the desired rubber-like article.

The liquid mercapto terminated polymers can be cured by oxidation to the disulfide with a wide variety of oxidizing agents.

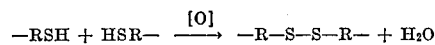

Any of the conventional oxidizing agents may be employed, such as air, oxygen, metallic oxides and peroxides, as well as oxygen-containing salts such as chromates, manganates, and permanganates. When the liquid polymer is to be used as a coating or as an impregnant for porous materials such as paper, leather, or the like, curing can be effected by the action of air or oxygen. Where the polymer is to be used in sealing, caulking, or in the fabrication of solid parts, the choice of oxidizing agent will be governed to some extent by the end use, an oxidizing agent preferably being selected which can remain in the final product.

Polysulfide sealants are prepared by compounding the liquefied polymers with curing agents, fillers, plasticizers, adhesion promotors and other agents to form a mastic. Curing agents are used to accelerate or retard the conversion of the liquid polymers to cross linked solids. Metallic oxides, metallic peroxides, organic peroxides, and organic nitro compounds are examples of accelerators that can be used. Stearic and oleic acid can be used as retarders. Fillers can be used to improve the physical properties of the cured polymers. Suitable fillers are carbon black, calcium carbonate, colloidal silica, titanium dioxide, lithopone, zinc sulfide, and the like. Plasticizers can be used when softer cured polymers are required. Dibutyl phthalate and other dibasic acid esters are satisfactory. Liquid epoxy and phenolic resins can be added to promote adhesion, and furan resins and chlorinated rubbers can be used as primers.

The alkali metal tetrathiocarbonate used as starting material is readily prepared by reaction of an alkali metal hydrosulfide with sulfur and carbon disulfide in alcoholic solution according to the scheme $$2\,NaSH + S + CS_2 \rightarrow Na_2CS_4 + H_2S \uparrow$$

The following specific examples further illustrate the invention. Parts are by weight except as otherwise noted.

EXAMPLE 1

Preparation of polymers

Six polymer preparations were carried out, in the first of which 237 grams (0.127 mole) of sodium tetrathiocarbonate were mixed with 22.0 grams (0.127 mole) of bis (2-chloroethyl) formal and 200 ml. of absolute ethyl alcohol. In the remaining preparations, various proportions of the dichloroethyl formal were replaced by trichloropropane. The mixtures were heated and stirred at reflux of 78° C. under nitrogen for 24 hours, then allowed to stand at 25° C. for 16 hours.

In each case, the product was a yellow liquid phase and a solid phase consisting of a yellow gummy solid mixed with a powdery yellow solid. The liquid phase was decanted from the solid, and the solid was washed with four 50-ml. portions of alcohol then with four 50-ml. portions of acetone. The solids were dried and weighed and then washed with water to dissolve the salt formed as a by-product in the reaction, and the insoluble residue was again dried and weighed. The alcohol solutions and the alcohol washings were combined and evaporated, and the residues weighed. The acetone soluble fractions were similarly recovered and weighed after evaporation of the acetone. In each case, the weight of the water soluble fraction was in the range of 95–105% of the theoretical weight of the sodium chloride produced in the reaction.

The theoretical yields and characteristics of the various polymer fractions are listed in Table I.

TABLE I.—POLYMERS PREPARED WITH DICHLOROETHYL FORMAL AND SODIUM TETRATHIOCARBONATE

| Polymer number | Percentage of formal replaced by trichloropropane | Molal ratio [1] | Yield of polymer fractions, percent [2] | | | Total yield of polymer, percent | Viscosity of polymer fractions | | |
|---|---|---|---|---|---|---|---|---|---|
| | | | Alcohol soluble | Acetone soluble | Insoluble | | Alcohol soluble | Acetone soluble | Insoluble |
| IV [3] | 0 | 1.0:1.0:00 | 25 | 15 | 60 | 100 | Thin liquid | Thin liquid | Plastic solid. |
| V | 7.5 | 1.0:0.85:0.10 | 15 | 15 | 65 | 95 | ___do___ | ___do___ | Elastic solid. |
| VI-1 | 0.3 | 1.0:0.997:.002 | 20 | 50 | 10 | 80 | ___do___ | Viscous oil | Sticky, plastic solid. |
| VI-2 | 0.3 | | 20 | 20 | 55 | 95 | Viscous oil | ___do___ | Elastic solid. |
| VII-1 | 1.5 | 1.0:.98:.01 | 15 | 40 | 30 | 85 | ___do___ | ___do___ | Plastic soldi. |
| VII-2 | 1.5 | | 25 | 20 | 55 | 100 | ___do___ | Very viscous oil | Sticky, plastic solid. |

[1] Sodium tetrathiocarbonate: dichloroethyl formal: trichloropropane.
[2] Polymer yield calculated as percent of theory for a disulfide polymer.
[3] The designation is used for reference to the polymer fraction that is insoluble in alcohol and acetone.

Polymer IV, the linear polymer prepared by the reaction of sodium tetrathiocarbonate with dichloroethyl formal, was a light green solid with the consistency of putty. It gradually softened on heating and became quite fluid at 90–100° C. It was soluble in aniline and in dimethyl formamide. Its sulfur content was found to be 35.4%.

The infrared absorption spectrum of Polymer IV has characteristic absorption peaks at 3.4 to 3.5 microns, 6.8 microns, 7.1 microns, 7.3 microns, 7.9 microns, 8.3 microns, 8.7 microns, 8.8 microns, 9.1 microns, 9.3 microns, 10.2 microns, and 12.1 microns.

A polymer prepared in the same manner as Polymer IV above except that dibromoethyl formal was substituted for dichloroethyl formal had similar characteristics and a substantially identical infrared spectrum.

Polymer V, the cross linked polymer prepared by the reaction of sodium tetrathiocarbonate with dichloroethyl formal and trichloropropane (1.00:0.925:0.05 mole ratio), was a gray rubbery solid. The polymer softened and lost its elasticity at 210–225° C., melted at 240° C. and decomposed at 260°–280° C. It was swollen by aniline, but not dissolved. It was soluble in dimethyl formamide. Its sulfur content was found to be 32.1%.

EXAMPLE 2

Liquefaction of polymers

Polymers IV and V from Example 1 above were mixed with hot (80° C.) alcoholic sodium hydrosulfide (NaHS) in the proportion of about one part of polymer per ten parts of 5% alcoholic solution of hydrosulfide. Upon agitation of the mixtures for about 30 minutes, Polymer IV became a free flowing liquid, Polymer V became a plastic mass in which the original particles had lost their identity. A sample of Polymer IV was liquefied by heating a suspension of a one gram sample in 10 ml. of an aqueous solution containing about 5% sodium hydrosulfide and about 2% sodium sulfite resulting in a fluid polymer. Treatment of samples of Polymers IV and V with 10% aqueous sodium hydroxide at 100° C. for 2 hours did not change the viscosities of the polymers, and treatment of these polymers with aniline under similar conditions had only slight if any effect on their viscosities.

The infrared absorption curve for the liquid polymer obtained by treating Polymer IV with sodium hydrosulfide exhibits characteristic absorption peaks at 3.4 microns, 3.5 microns, 6.8 microns, 7.1 microns, 7.3 microns, 7.7 microns, 8.7 microns, 9.0 microns, 9.1 microns, 9.3 microns, and 10.2 microns.

EXAMPLE 3

Curing of liquefied polymers

One hundred parts each of the liquid polymers obtained from Polymer IV above, were mixed with 30 parts each of a paste prepared from 50 parts of lead dioxide and 45 parts of dibutyl phthalate plasticizer and 5 parts of stearic acid, and a similar mixture was made from a commercial polysulfide polymer prepared by the reaction between sodium polysulfide of rank 2.25 and bis(2-chloroethyl) formal containing 1.5% trichloropropane, followed by liquefaction with sodium hydrosulfide and sodium sulfite. The mixtures were air cured for 16 hours and resulted in the formation of rubbery products. When tested for recovery from compression by a qualitative test, it was observed that the curved polymers of the example were superior to the commercial product.

EXAMPLE 4

Polymers were prepared from sodium tetrathiocarbonate, dichloroethyl formal and trichloropropane in mole ratios 1.0:0.997:0.002 (Polymer VI) and 1.0:0.985:0.010 (Polymer VII) by two different procedures.

In the first procedure, the monomers were added to cold ethanol and the mixture was refluxed for 24 hours under nitrogen. In the second procedure a hot (75° C.) mixture of dichloroethyl formal and trichloropropane was added over a 5-minute period to a refluxing slurry of sodium tetrathiocarbonate in ethanol and the resulting mixture was refluxed 24 hours under nitrogen. The yields and viscosities of the various fractions of polymers obtained by each method are shown in Table II below:

TABLE II.—YIELDS AND PROPERTIES OF "TETRATHIOCARBONATE" POLYMERS PREPARED WITH DIFFERENT AMOUNTS OF TRICHLOROPROPANE

| Polymer number | Mole trichloropropane | Procedure number | Yield of Polymer Fractions, percent [1] | | | Total yield of polymer, percent [1] | Viscosity of Polymer Fractions | | | Sulfur content of insoluble polymer fraction, percent |
|---|---|---|---|---|---|---|---|---|---|---|
| | | | Alcohol soluble | Acetone soluble | Insoluble alcohol, acetone, or water | | Alcohol soluble | Acetone soluble | Insoluble | |
| VI-3 | 0.002 | 1 | 15 | 50 | 25 | 90 | Viscous oil | Viscous oil | Plastic solid | |
| VI-4 | 0.002 | 2 | 10 | 10 | 70 | 90 | do | do | Very viscous oil | |
| VII-3 | 0.010 | 1 | 20 | 45 | 30 | 95 | do | do | Sticky, plastic solid | 34.2 |
| VII-4 | 0.010 | 2 | 10 | 20 | 55 | 85 | do | do | do | 36.7 |

[1] Yields are calculated as percent of theory for a disulfide polymer.

It will be noted that the two polymers prepared by the first procedure. Polymers VI-3 and VII-4, gave low yields of the insoluble fraction, and the insoluble polymer from the preparation with the lower amount of trichloropropane cross linking agent (Polymer VI-3) was less viscous than the one from the preparation with more cross linking agent (Polymer VII-3).

The two preparations by the second procedure (Polymers VI-4 and VII-4), yielded relatively high proportions of insoluble polymers, but the viscosities of the insoluble fractions were not as high as those of similar fractions from Example 1.

EXAMPLE 5

Preparation of disulfide monomer

In 80 ml. of ethanol there were mixed 13.7 grams (0.10 mole) of n-butyl bromide and 9.3 grams (0.05 mole) of sodium tetrathiocarbonate and the resulting mixture was refluxed for 2 hours at 78° C.

The alcohol was evaporated from the mixture in a rotary evaporator, and there was obtained a mixture of a salt and an oily liquid. The oily liquid was extracted from the salt with petroleum ether, and recovered from the extract by evaporation of the petroleum ether. The yellow oil remaining after evaporation of the solvent weighed 7.1 grams, had a refractive index of 1.4915, and it boiled at 94–95° C. at 4 mm. Hg. Elemental analysis of a distilled sample is shown below and compared to calculated values for n-butyl tetrathiocarbonate and for n-butyl disulfide.

| Percent | Found | Calculated | |
|---|---|---|---|
| | | n-butyl tetrathiocarbonate | n-butyl disulfide |
| S | 37.2 | 50.4 | 36.0 |
| H | 10.2 | 7.1 | 10.1 |
| C | 53.1 | 42.5 | 53.0 |

These results indicate that the compound obtained was n-butyl disulfide.

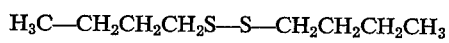

obtained in a yield of 80% of theory.

While the above describe the preferred embodiments of my invention, it will be understood that departures can

I claim:
1. The process for preparing a polymer characterized by the presence of the following repeating units:

$$\{C_2H_4OCH_2OC_2H_4\text{—}S\text{—}S\}$$

which comprises heating a mixture of substantially stoichiometric proportions of an alkali metal tetrathiocarbonate and a dihaloethyl formal wherein the halogen is a member selected from the group consisting of chlorine and bromine in a lower aliphatic alcohol reaction medium at temperatures between about 40° C. and about the reflux temperature of the reaction mixture for a period sufficient to produce a polymeric product.

2. The process according to claim 1 wherein the reaction medium is ethyl alcohol.

3. The process according to claim 1 wherein not more than about 0.10 mole of the dihaloethyl formal is replaced by trichloropropane.

References Cited

UNITED STATES PATENTS 3,367,975   2/1968   Liggett _____ 260—608

DONALD E. CZAJA, *Primary Examiner.*

M. I. MARQUIS, *Assistant Examiner.*